US010246273B2

(12) United States Patent
Sardella et al.

(10) Patent No.: US 10,246,273 B2
(45) Date of Patent: Apr. 2, 2019

(54) TRIM REMOVAL SYSTEM

(71) Applicant: Alliance Machine Systems International, LLC, St. Louis, MO (US)

(72) Inventors: Louis M. Sardella, Crystal Bay, NV (US); Kevin P. Brown, Nine Mile Falls, WA (US); Marius D. Batrin, Liberty Lake, WA (US)

(73) Assignee: ALLIANCE MACHINE SYSTEMS INTERNATIONAL, LLC, St. Louis, MO (US)

( * ) Notice: Subject to any disclaimer, the term of this patent is extended or adjusted under 35 U.S.C. 154(b) by 38 days.

(21) Appl. No.: 14/919,896

(22) Filed: Oct. 22, 2015

(65) Prior Publication Data
US 2016/0122136 A1 May 5, 2016

Related U.S. Application Data

(60) Provisional application No. 62/074,843, filed on Nov. 4, 2014.

(51) Int. Cl.
*B65H 5/22* (2006.01)
*B65G 51/03* (2006.01)
*D21F 7/00* (2006.01)
*B26D 7/18* (2006.01)

(52) U.S. Cl.
CPC .......... *B65G 51/03* (2013.01); *B26D 7/1854* (2013.01); *B65H 5/228* (2013.01); *D21F 7/006* (2013.01); *B65H 2301/4461* (2013.01); *B65H 2406/1132* (2013.01)

(58) Field of Classification Search
CPC ...... B26D 7/18; B26D 7/1854; B26D 7/1818; B65G 51/03; B65H 5/228; B65H 2301/4461; B65H 2406/113; B65H 2406/1132; B65H 2406/122; Y10T 83/2066; Y10T 83/0453; Y10T 83/0443; Y10T 83/2074; D21F 7/006
See application file for complete search history.

(56) References Cited

U.S. PATENT DOCUMENTS 3,270,929 A * 9/1966 Foster, Jr. ............ B26D 7/1818
                                                  225/103
3,401,930 A * 9/1968 Bishop .................. B65H 9/166
                                                  271/225
5,183,251 A    2/1993 Sardella
(Continued)

OTHER PUBLICATIONS

Preliminary Report on Patentability, dated May 18, 2017, in International Application No. PCT/US2015/056841 filed on Oct. 22, 2015.

*Primary Examiner* — Jeremy R Severson
(74) *Attorney, Agent, or Firm* — Thompson Coburn LLP

(57) ABSTRACT

An apparatus uses forced air to remove trim from cut sheets during a converting process. The apparatus may include a plurality of wheels, arranged to allow trim to fall between the wheels, and one or more air chambers, configured to propel air toward the sheets as they are conveyed on the wheels in order to remove trim from the sheets. A method may include conveying sheet stock on wheels arranged to allow trim to fall through them, and propelling air toward the sheet stock with air chambers such that trim is removed from the sheet stock by the propelled air.

8 Claims, 29 Drawing Sheets

(56) References Cited

U.S. PATENT DOCUMENTS

| | | | | |
|---|---|---|---|---|
| 5,379,668 A | * | 1/1995 | Standing | B26D 7/1854 83/167 |
| 5,733,081 A | * | 3/1998 | Dowdle | B23Q 11/0042 29/DIG. 56 |
| 5,906,363 A | * | 5/1999 | Reis | B25B 11/005 269/21 |
| 7,281,711 B2 | * | 10/2007 | Dannemann | B65H 5/00 271/248 |
| 9,027,737 B2 | | 5/2015 | Talken et al. | |
| 2013/0074457 A1 | * | 3/2013 | Brown | B65B 11/00 53/580 |
| 2013/0087029 A1 | * | 4/2013 | Iyatani | B26D 1/245 83/13 |

* cited by examiner

TRIM REMOVAL SYSTEM

RELATED APPLICATION DATA

This application claims the benefit of provisional application Ser. No. 62/074,843, filed on Nov. 4, 2014, the disclosure of which is incorporated by reference herein.

TECHNICAL FIELD

This disclosure relates generally to sheet stock processing, and more specifically to removing trim from cut sheet stock.

BACKGROUND

Sheet stock processing is used in numerous industries, including box manufacturing. Sheet processing typically involves multiple stages to convert generally flat sheet stock (e.g., paper, card stock, and cardboard) into boxes or other products. Such stages may include, among others, printing on the sheet stock, cutting and scoring, trim removal, and folding and gluing. The entire process is generally referred to as "converting."

Typically, a rotary die cut machine prints and cuts blanks of sheet stock to produce sheets of different sizes and shapes. The sheets may have pieces stamp-cut for removal, and they may have score marks to allow for folding or assembly into a desired configuration. The sheets also may have printing on them. A trim remover receives the sheets from the rotary die cut machine. The trim remover removes excess scraps of stock, or trim, from the sheet. Typical trim removers include dual belt systems including an upper and a lower belt for conveying the sheets from the die cut machine to downstream processing stages.

Trim can be attached to stamped sheets in various locations. Scrap may be attached to the sheet at its sides, in which case the scrap may be referred to as edge trim. The front and back excess scrap is lead edge trim and trail edge trim, respectively. The cut outs internal to the sheet can be of numerous shapes and sizes, and are called normal trim. When properly cut from the sheet and ejected from the die with rubber strips, the trim is called loose trim. Scrap that is cut but remains attached to the sheet by a small amount of material is called hanging trim. Scrap may also be properly cut, but fail to be ejected from the sheet. This is called trapped trim.

SUMMARY

Present embodiments are generally disclosed and directed toward the use of forced air in removing trim from sheets during the converting process. According to some embodiments, an apparatus is provided. The apparatus can include a plurality of wheels, arranged to allow trim to fall between the wheels, and one or more air chambers, configured to propel air toward the sheets as they are conveyed on the wheels in order to remove trim from the sheets. According to other embodiments, a method is provided. The method can include conveying sheet stock on wheels arranged to allow trim to fall through them, and propelling air toward the sheet stock with air chambers such that trim is removed from the sheet stock by the propelled air.

DETAILED DESCRIPTION

Prior art trim removers can trap trim in and around the sheet. The trapped trim can be conveyed along the trim remover and delivered with the sheet to downstream processes. If trim is not properly removed from the sheet, it can result in jams and unwanted scoring on the sheet. Such problems can result in production delays and revenue loss for sheet manufacturers. Certain embodiments disclosed herein provide a forced air trim removal mechanism for removing trim from cut sheets while avoiding unwanted excess trim from being conveyed to downstream processes. Various embodiments will now be described with reference to the drawings.

Figure 1:
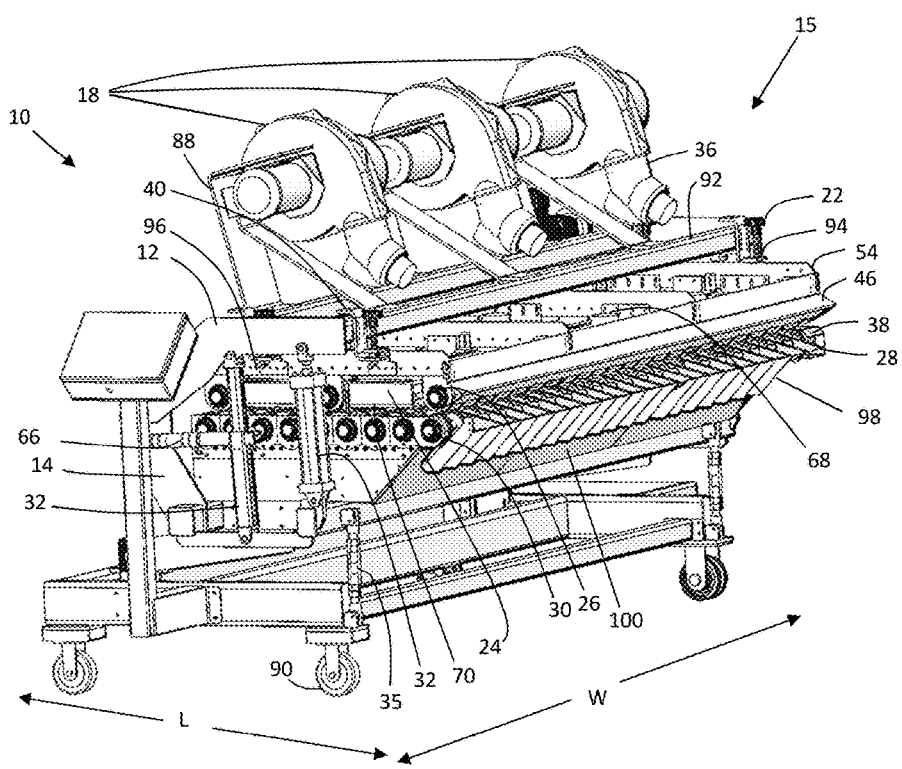
FIG. 1 is a perspective view of a trim removal section in accordance with embodiments discussed herein.

FIG. 1 is a perspective view of a trim removal section in accordance with an exemplary embodiment. The trim removal section or trim remover is generally identified by reference numeral 10. The trim removal section 10 is generally configured as a converting machinery component. The converting machinery, of which the trim removal section 10 is a part, may operate to convert blanks of sheet material into finished products by various steps including cutting, scoring, breaking, printing, folding, and so on. By way of example and not limitation, this disclosure describes the trim removal section 10 as being used in connection with converting machinery used to convert cardboard or other stock material, such as corrugated cardboard, into boxes. However, it should be appreciated that the trim removal section 10 may be used in connection with converting machinery used to process other types of sheet material.

The trim removal section 10 is generally configured to be positioned downstream from a rotary die cutter or other converting machinery apparatus or section that operates to cut blanks of sheet material in some way. By way of example and not limitation, this disclosure describes the trim removal section 10 as being used in connection with a rotatory die cutter. However, it should be appreciated that the trim removal section 10 may be used in connection with other cutting machinery, such but not limited to a flatbed die cutter. In corrugated box making implementations, the rotary die cutter may receive blanks of corrugated sheet material from a corrugator, feeder, or other upstream equipment. The rotary die cutter may cut the blanks of corrugated sheet material to form cut sheets that can be further processed to form individual boxes. In one respect, the rotatory die cutter may trim away excess material around the leading edge, the trailing edge, the sides, or the interior of a sheet. The rotatory die cutter may also perforate the sheets along lines where the sheets will later be broken to separate out individual boxes. The rotatory die cutter may also score the sheets along lines where the final product will be folded in the process of assembling a box. As a result of these various operations, a rotatory die cutter produces cut sheets, as well as trim. As used herein, "trim" generally refers to pieces of scrap material that are either partially or fully separated from the cut sheet that is output from the rotary die cutter or other cutting apparatus.

The trim removal section 10 may be configured to receive the cut sheets and to convey the cut sheet away from the rotary die cutter downstream to a stacker or other converting machinery for further processing. The trim removal section 10 includes a plurality of lower wheels 38 that are supported by a bottom support structure 14. The trim removal section 10 also includes a head 15 that is supported by a top support structure 12 so as to be generally positioned above the lower wheels 38. In operation, the lower wheels 38 convey the cut sheets through the trim removal section 10. The head 15 supports the operation of the wheels 38 by propelling a flow of air downward against the top side of the sheets. The downward flow of air enhances the traction of the lower wheels 38 by imparting a downward force on the sheets that increases the frictional force between the sheets and the wheels 38. Additionally, the downward flow of air produced by the head 15 may remove trim that is carried with the sheet as the sheet is conveyed away from the rotary die cutter. Specifically, the head 15 may blow trim downward and away from the sheet. This trim may then be collected by a scrap conveyer that may be located underneath the trim removal section 10.

Figure 2:
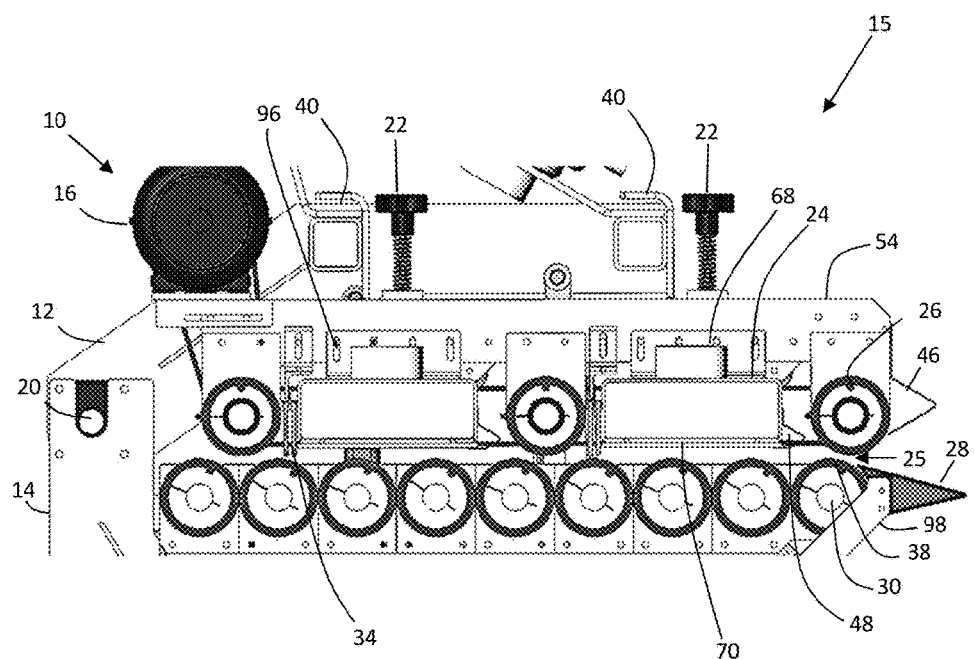
FIG. 2 is a cross-sectional side view of the trim removal section of FIG. 1.

FIG. 2 is a cross-sectional side view of the trim remover 10 that shows various components including the lower wheels 38 and the head 15. As can be seen in FIGS. 1 and 2, the head 15 may include one or more air chambers 24 that are attached to one or more air chamber support bars 54. In addition to the air chambers 24, the air chamber support bars 54 may support one or more upper wheels 26 and/or one or more brushes 34. In lieu of or in addition to air chambers 24, any suitable structures may be used, including wheels, conveyors of any suitable width, air brushes, brushes, plates, and combinations of these.

The air chamber support bars 54 may extend longitudinally along a length L (FIG. 1) of the trim remover 10 and may attach to a crossbar 92. The crossbar 92 may extend laterally across a width W (FIG. 1) of the trim remover 10 and may attach to the top support 12. As shown in FIG. 2, these various attachments position the head 15 such that the air chambers 24 are disposed above the lower wheels 38 so as to define an interior space 25 through which the sheets are conveyed. Any other structure besides lower wheels 38 may be used to support the sheet material, including conveyors of any suitable width, air brushes, brushes, plates, and combinations of these. It is to be recognized that any suitable structures for attaching and positioning the air chambers 24 may be used.

As mentioned, the trim remover 10 may be positioned downstream from a rotary die cutter or other converting machinery apparatus. In the embodiment shown in FIG. 1, the trim remover 10 may be positioned using wheels 90 that are attached to the bottom support 14 and that provide for easy mobility of trim remover 10. In other embodiments, the wheels 90 may be replaced by casters or other mechanisms of transporting the trim remover 10. In yet other embodiments, the bottom support 14 may rest directly on or be attached to a floor surface. The trim remover 10 may include a height adjustment mechanism 35, such as a piston, that may be used to raise or lower the leading edge of the trim remover 10 so as to be aligned with the rotary die cutter.

Figure 20:
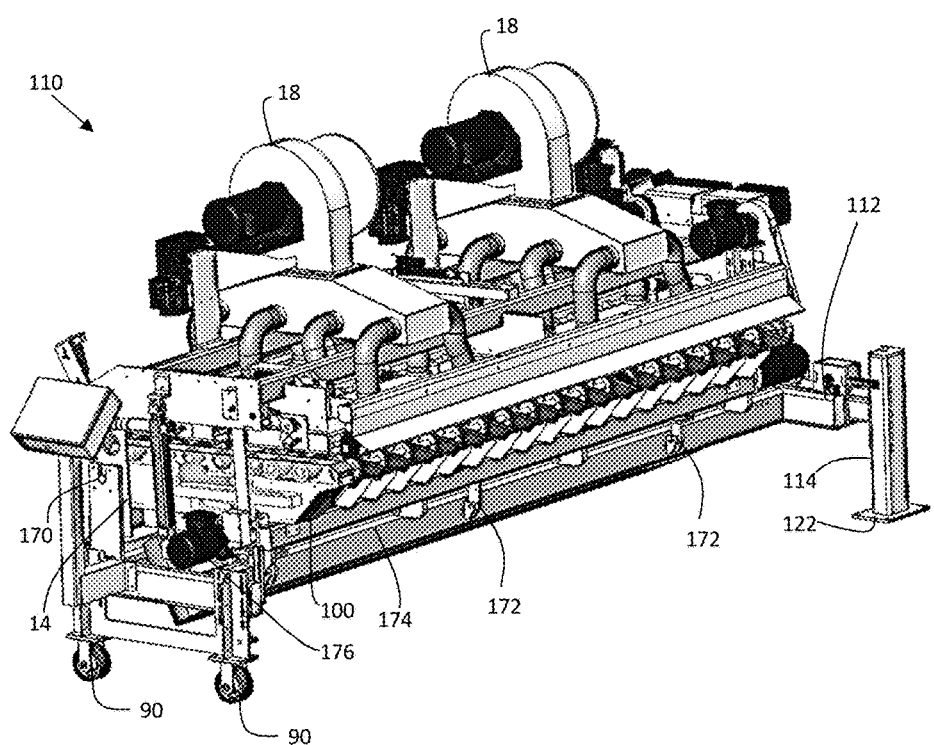
FIG. 20 is perspective view of another embodiment of a trim remover from an entry end of the trim remover.
Figure 21:
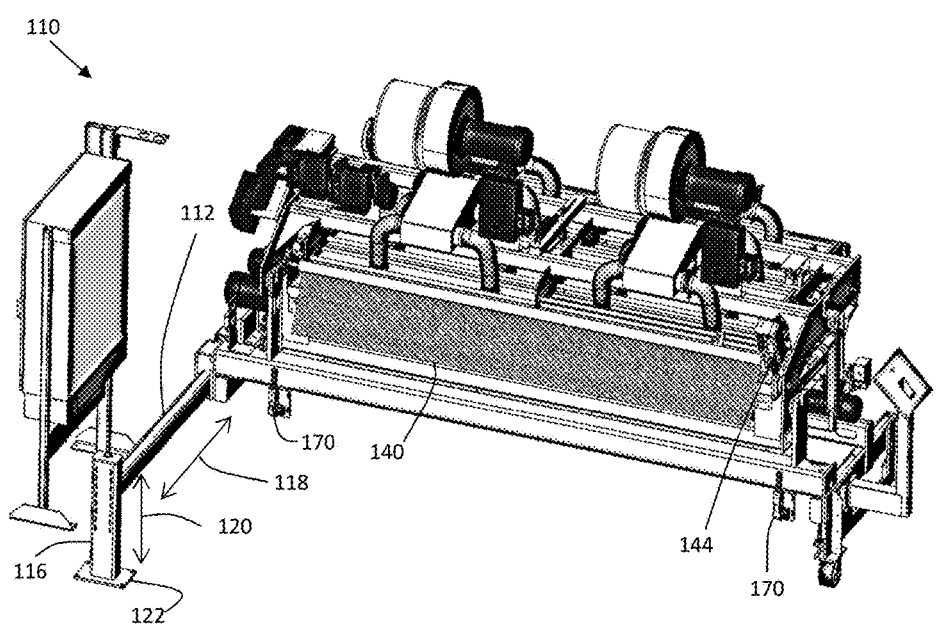
FIG. 21 is perspective view the trim remover of FIG. 20 from an exit end of the trim remover.

In yet other embodiments, for instance, as shown in FIGS. 20-21, the trim remover 110 may be supported by a track 112 spanning between an adjustable leg 114 (FIG. 20) at an entry end of the trim remover and a second adjustable leg 116 (FIG. 21) at an exit end of trim remover. The trim remover 110 may be coupled to the track 112 to allow linear motion of the trim remover relative to the track. The trim remover 110 may be locked in position along a length of the track 112. The track may have an adjustable length (e.g. telescoping) or the track length may be fixed depending upon the application. The track 112 may be arranged in the length direction 118 as shown in FIGS. 20-21, and/or in the transverse width direction to allow the trim remover to span over a scrap conveyor or scrap pit. The adjustable legs 114,116 allow positioning of the trim remover 110 in the vertical direction 120 as may be desired so as to place the trim remover in line with converting machinery to receive sheets from the converting machinery. Also, the adjustable legs 114,116 and track 112 allows the trim remover to maintain a "home" position relative to converting machinery when the trim remover is spaced from converting machinery to allow access therebetween. Each of the adjustable legs 114,116 may have a foot 122 which may be stationary or permanently affixed to the floor surface. When access is needed between the trim remover and the converting machinery, the trim remover may be moved along the track 112 in the length 118 and/or width direction with the opposite side of the trim remover rolling on its wheels 90 in the direction of travel to create access between the trim remover and the converting machinery.

Once appropriately positioned, the trim remover 10 may accept cut sheets that are ejected from the rotary die cutter. The cut sheets may be received into the interior space 25 of the trim remover 10 between an optional leading edge guide 46 and an optional plurality of fingers 28. As shown in FIG. 2, the leading edge guide 46 may be attached to the leading edge of the air chamber support bars 54 to ensure that sheets entering the trim remover 10 are directed to the correct position. The leading edge guide 46 may ensure that sheets which are bent or out of position when leaving a die cut machine are directed to the proper location when entering the trim remover 10.

Opposite the leading edge guide 46, the entrance to trim remover 10 optionally may include a plurality of fingers 28 that provide a surface, such as a slanted surface, for guiding sheets into the trim remover 10. In various embodiments, the fingers 28 may be triangular strips of material, such as plastic or metal, that are positioned so that a ramped surface guides the sheets into trim remover 10. As shown in FIG. 1, the fingers 28 may be positioned substantially parallel to one another along the width W of the trim remover 10 to allow trim from the sheets to fall away from the sheets as the sheets enter the trim remover 10. In various embodiments, the fingers 28 may be attached to finger supports 98, which, in turn, may be attached to a lower structure 100. In the embodiment of FIG. 2, the lower structure 100 is attached to bottom support 14. It is to be appreciated that leading edge guide 46 and fingers 28 are not required, or they may be replaced with any suitable structures, including wheels, belts, brushes, etc.

As can be seen in FIG. 2, the trim remover 10 may additionally include one or more air chamber edge guides 48. In various embodiments, the air chamber edge guides 48 serve a similar purpose to leading edge guide 46. The air chamber edge guides 48 may help to guide sheets traveling through trim remover 10 by deflecting downward any raised or bent portions of the sheets and ensuring that the sheets pass underneath the air chambers 24. In various embodiments, each air chamber 24 may have its own air chamber guide 48. In certain embodiments, the air chamber guides 48 may have a generally ramped shape to deflect sheets downward toward the lower wheels 38. The air chamber guides 48 may extend the entire width of the air chambers 28, or may be positioned at intervals across a leading edge of the air chambers 24. The leading edge guide 46 is optional, and a wheel, brush, spring-loaded lever, etc., also may be used.

Figure 27:
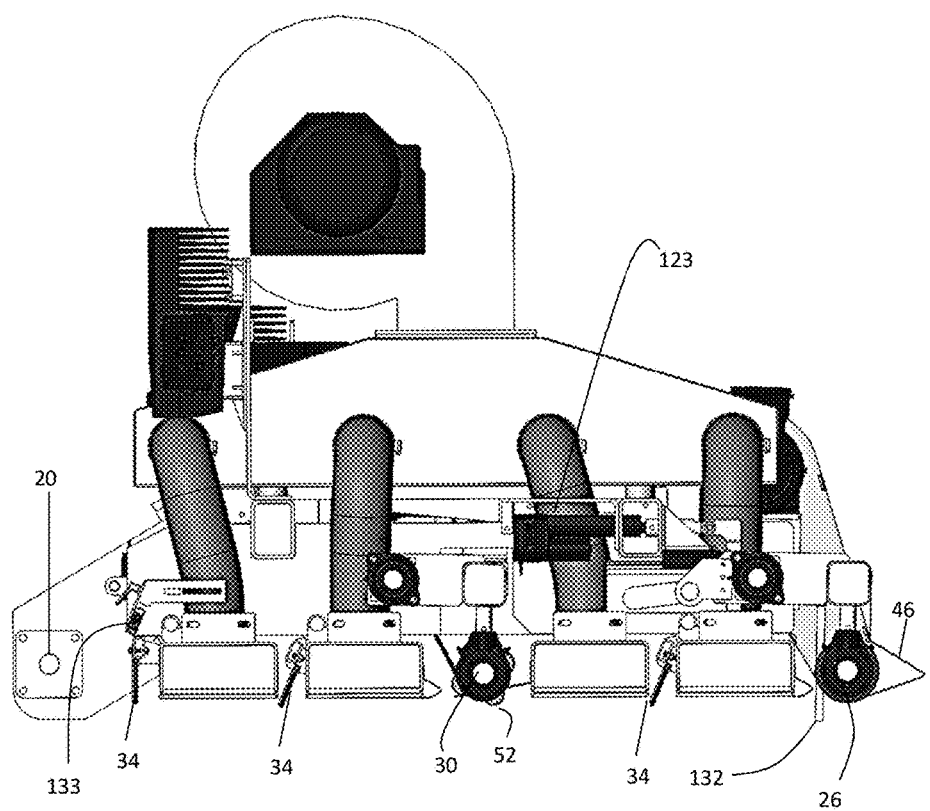
FIG. 27 is a side view of the trim remover of FIG. 20 with certain structure removed for ease of illustration of other components.

After the sheets pass between the leading edge guide 46 and the fingers 28, the lower wheels 38 may convey sheets into and through the interior space 25 of the trim remover 10. Once the sheets pass through the interior space 25 of the trim remover 10, the sheets may be ejected from the trailing edge of the trim remover 10 into a stacker or other processing machine. One or more upper wheels 26, or belts, brushes, air brushes, guide plates, or other structures, may assist in conveying the sheets into and through the interior space 25 of the trim remover 10. In certain embodiments, an initial upper wheel 26 and an initial lower wheel 38 may create a nip point to convey sheets into the trim remover 10 and control the speed of entering sheets. For example, the upper wheels 26 may be driven at the same speed as the lower wheels 38. The upper wheels 26 and the lower wheels 38 may be rotary brush wheels (FIG. 16), wide rollers (FIG. 17), narrow rollers (FIG. 18), or any combination thereof. In some embodiments, the upper wheels 26 and the lower wheels 38 may be rubber coated, zero crush, and/or steel rollers. Other types of rollers are possible, without departing from the scope of the present disclosure. As shown in FIG. 27, an actuator 123 may be provided to allow vertical adjustment of the upper wheels 26 at the nip point.

Figure 12:
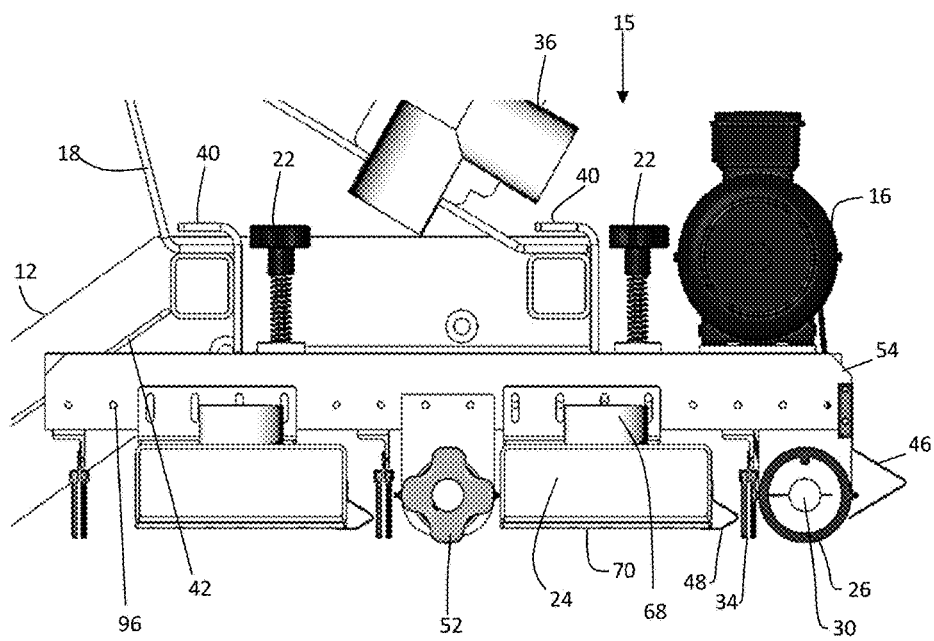
FIG. 12 is a side elevation view of an upper portion of the trim removal section of FIG. 11.
Figure 13:
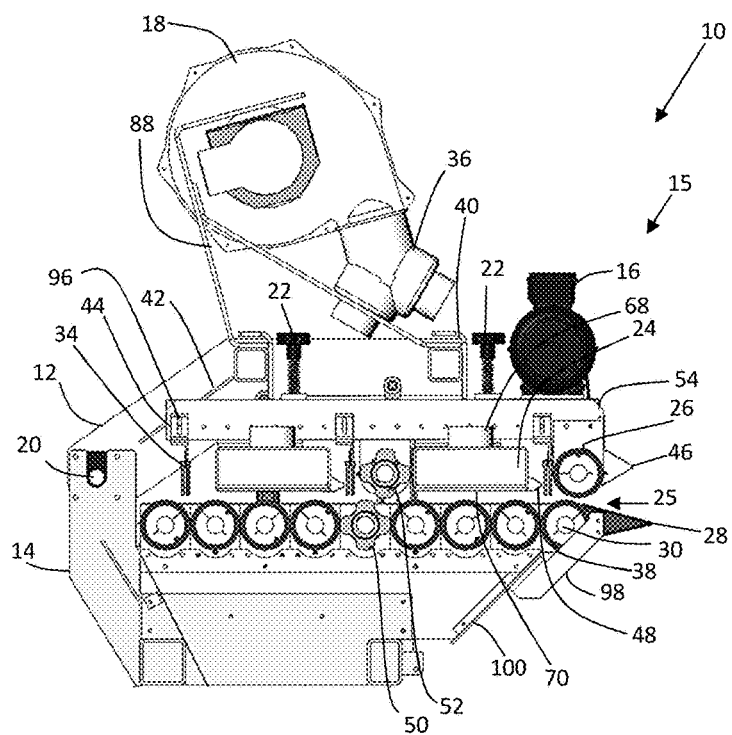
FIG. 13 is a side elevation view of the trim removal section of FIG. 11 in operating mode.
Figure 14:
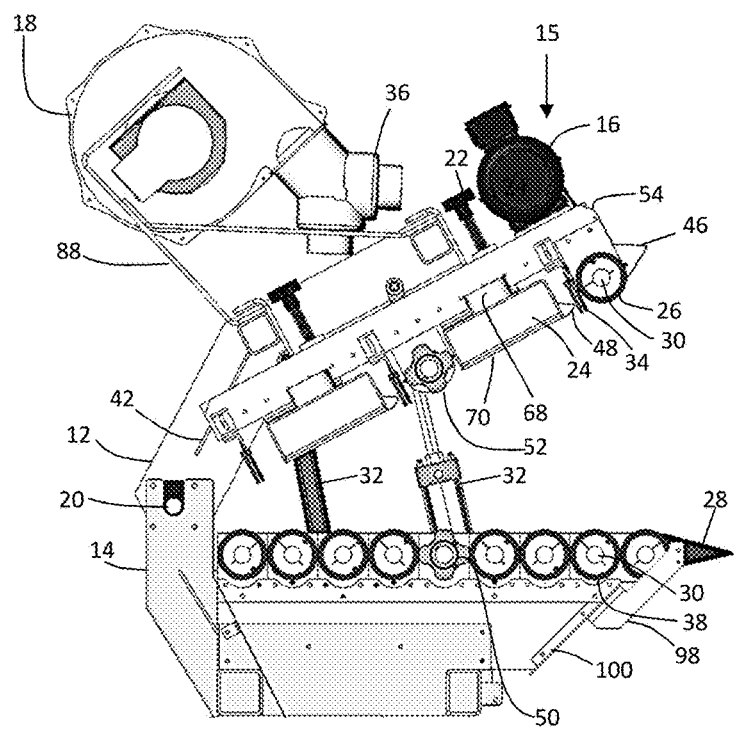
FIG. 14 is a side elevation view of the trim removal section of FIG. 11 in an open access position.
Figure 33:
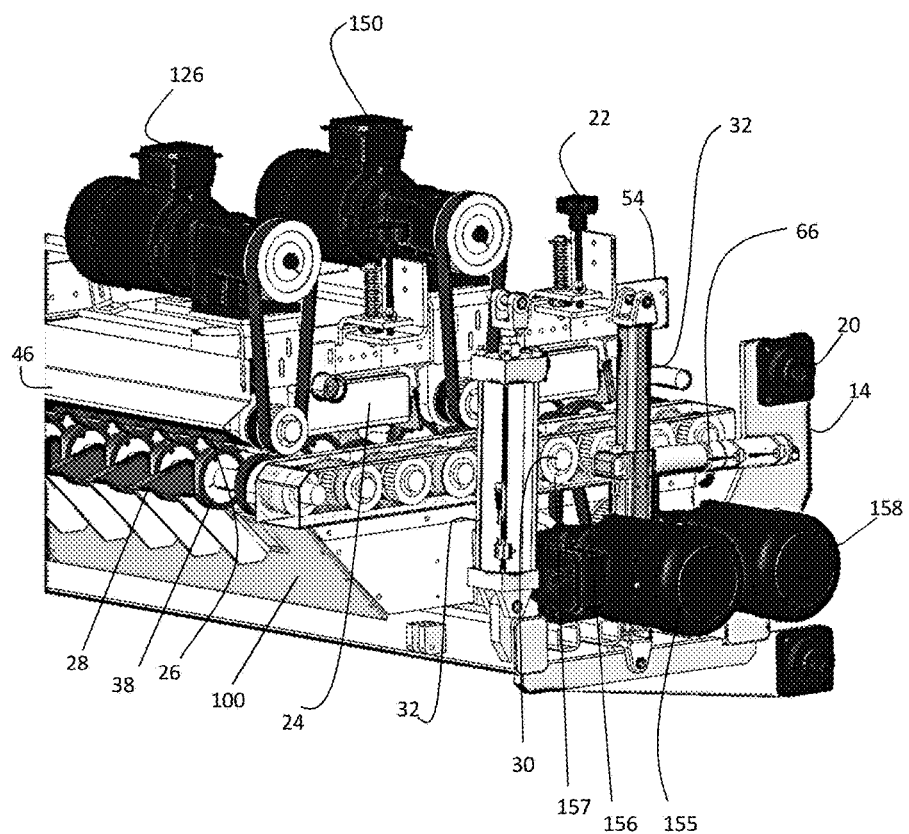
FIG. 33 is a partial perspective view of a portion of an alternate embodiment of the trim remover showing additional detail of an upper vibratory lobe axle rotation motor, top wheel axle rotation motor, lower vibratory lobe axle rotation motor, and bottom wheel axle rotation motor.

The upper wheels 26 may be driven by a motor FIG. 2 or other appropriate mechanism so as to ensure that sheets passing through the trim remover 10 maintain proper speed and alignment. For example, the embodiment of FIG. 2 includes a motor 16 that provides a driving mechanism for the upper wheels 26. The motor 16 may be positioned on top of trim remover 10, as depicted in FIG. 2. According to other embodiments, the motor 16 may be positioned on either side, or beneath trim remover 10. Additionally, the motor 16 may be positioned at either the entrance to the trim remover 10 (FIG. 12) or toward the exit of the trim remover 10, as depicted in FIG. 2. As another example, in the embodiment of FIG. 26, a motor 126 located adjacent to the nip point may be used to rotate the axle 30 of the entry or upper wheels 26. As shown in FIG. 33, the motor 126 located adjacent to the nip point may be used to rotate the axle 30 of the entry or upper wheels 26. The motor 16 may drive one or more one or more rows of upper wheels 26. In the embodiment of FIG. 2, the trim remover 10 includes three rows of upper wheels 26. In various embodiments, the upper wheels 26 may be driven about an axle 30 and provide a mechanism, placed above the sheets, that compliments the lower wheels 38 in order to ensure that sheets are conveyed through the trim remover 10. In various embodiments, there may be a larger or smaller number of upper wheels 26, or no upper wheels 26.

Figure 3:
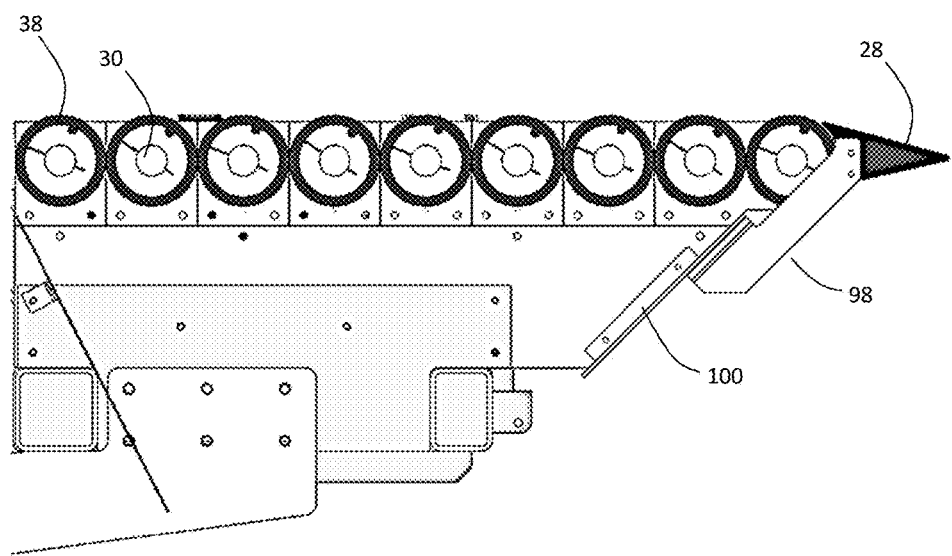
FIG. 3 is a side elevation view of a lower portion of the trim removal section of FIG. 1.
Figure 4:
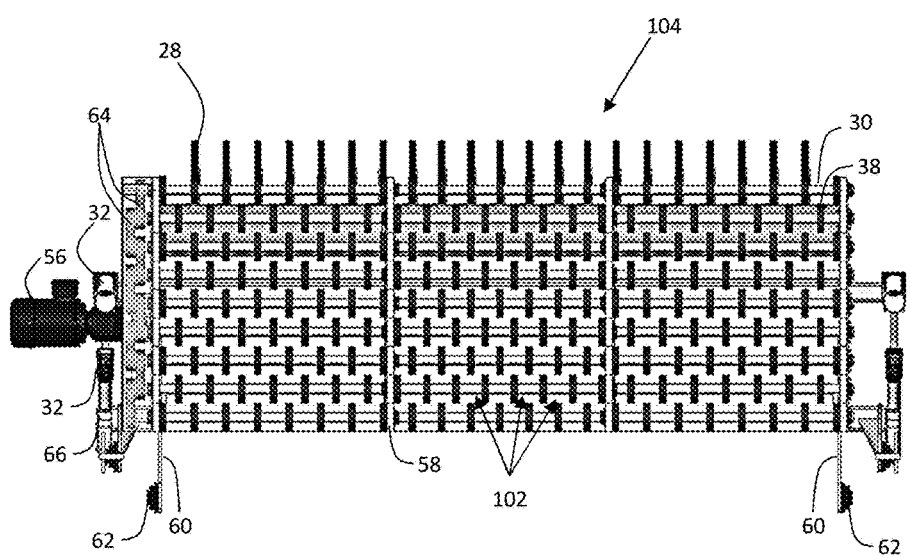
FIG. 4 is a top plan view a lower portion of the trim removal section of FIG. 1.

FIG. 3 is an enlarged view of the lower wheels 38 and the bottom support 14 structure. As shown in FIG. 3, the lower wheels 38 may be configured to rotate on axles 30. As mentioned, sheets received from the rotary die cutter may be conveyed through the trim remover 10 by the operation of the lower wheels 38. In various embodiments, the lower wheels 38 and/or the axles 30 may be driven using a motor or other propulsion mechanism (FIG. 4). For instance as shown in FIG. 33, a motor 158 may be used to rotate the axles 30 of the bottom wheels 38. The lower wheels 38 may be coated with a material having a high coefficient of static friction such as a rubber or other material. The sheets may be conveyed through the trim remover 10 by maintaining static contact points with the sheets as the lower wheels 38 rotate about the axles 30. As explained in further detail with respect to FIG. 4, the lower wheels 38 may be arranged to allow trim that is removed from the sheets by air from the air chambers 24 or other trim removal mechanisms to fall away from the sheets and out of the trim remover 10.

FIG. 4 is a top plan view of the lower wheels 38 and the bottom support structure 14. The lower wheels 38 may be arranged or otherwise interconnected so as to form a conveyor, which in FIG. 4 is generally identified with reference numeral 104. The conveyor 104 may be connected to a bottom support 14 (FIG. 2) by any suitable means, including, e.g., attachment bars 60 and connectors 62. The lower wheels 38 may be positioned at intervals along a plurality of axles 30. The intervals may be positioned so as to define a plurality of gaps 102 that provide sufficient space for trim falling from a sheet to pass through, but not so wide as to allow sheets to fall through or become jammed. In various embodiments, the lower wheels 38 may be positioned with a relatively small center-to-center distance. In some embodiments, the lower wheels 38 may be positioned in an alternating configuration, as shown in FIG. 4, such that wheels on one axle 30 line up with a midpoint between lower wheels 38 on a subsequent axle 30. In the embodiment of FIG. 4, the fingers 28 substantially line up with the lower wheels 38 on the leading axle 30. In other embodiments, the fingers 28 may be offset with respect to the lower wheels 38 or absent entirely.

Figure 5:
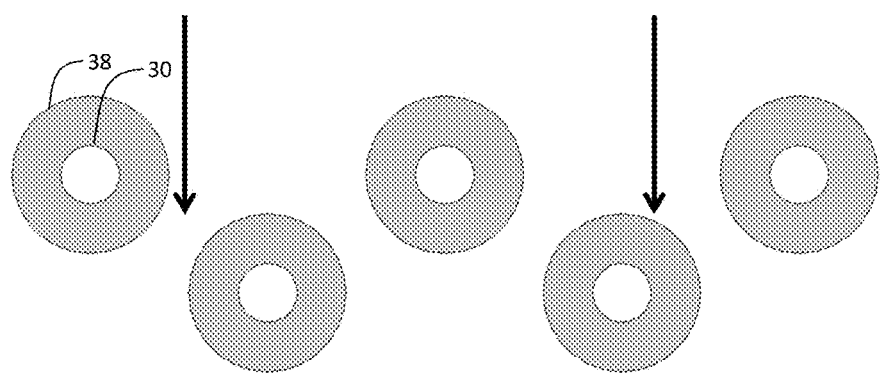
FIG. 5 is a side elevation view of an adjustable wheel conveyor, in accordance with an embodiment.
Figure 29:
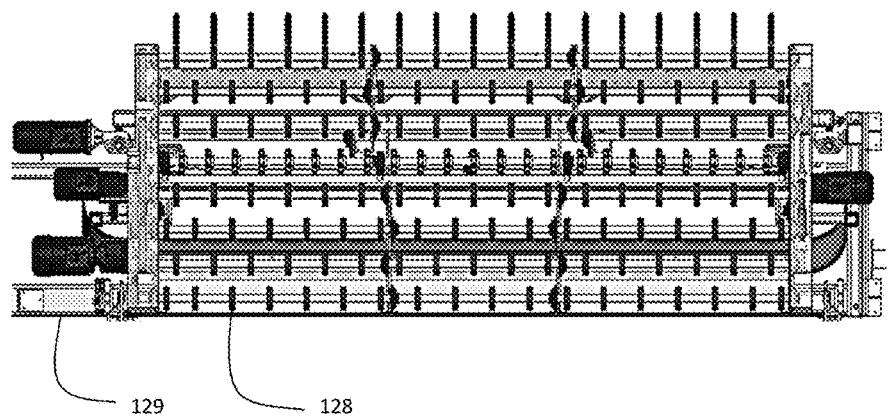
FIG. 29 is a top plan view a lower portion of the trim remover of FIG. 20.

As shown in FIG. 4, the axles 30 optionally may be driven by a motor 56, which may be in mechanical association with one or more belts 64. The motor 56 may drive the belts 64, which may be coupled to the axles 30 by static friction. As such, the rotational speed of the axles 30 may be adjusted by adjusting the speed of motor 56. In certain embodiments, as shown in FIG. 5, at least a portion of the axles 30 may be vertically adjustable. In these embodiments, a portion of the axles 30 may be raised or lowered so as to add or remove the number of lower wheels 38 in contact with the sheets passing through the trim remover 10. The number of lower wheels 10 in contact with the sheets may be adjusted, for example, to allow for larger gaps 102 to accommodate larger pieces of trim falling from the sheets. Axle supports 58 may be provide for additional structural support to axles 30. Additionally, in some embodiments, the axle supports 58 may be segmented, as shown in FIG. 4, in order to facilitate the raising and lowering of certain axles 30. FIG. 29 is similar to FIG. 4 and is a top plan view of the lower wheels 128 and the bottom support structure 129 of the trim remover 110 of FIGS. 20-21.

Figure 6:
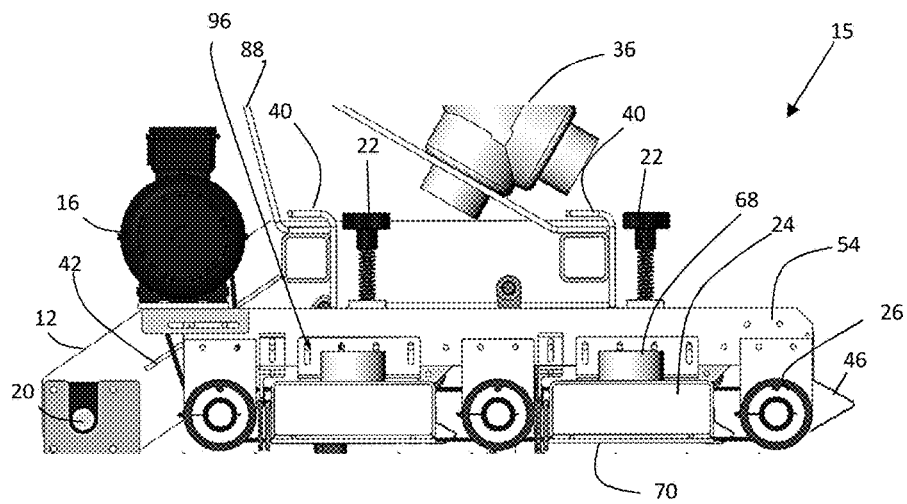
FIG. 6 is a side elevation view of an upper portion of the trim removal section of FIG. 1.

FIG. 6 is an enlarged view of the head 15 and the top support 12 structure. As shown in FIG. 6, in one embodiment the head 15 may include one or more air chambers 24 that propel air downward to provide a downward force on the sheets that are being conveyed through the trim remover 10. This downward force increases the traction of the lower wheels 38 by increasing the fictional force between the sheets and the lower wheels 38. Additionally, the downward flowing air are may serve to remove trim from the sheets. As shown in FIG. 1, the air chambers 24 may receive an intake of pressurized air from one or more air propulsion systems 18 that may be disposed on the top side of the trim remover 10. Here, the crossbar 92 can be used to provide support to air propulsion systems 18 by use of supports 88. In the exemplary embodiment of FIG. 1, the air propulsion systems 18 are positioned above top support 12. In other embodiments, propulsion systems 18 may be positioned in any suitable location including underneath bottom support 14, on the ground, or on either side of trim remover 10 so long as air propulsion systems 18 are able to provide propelled air to air chambers 24 and the air propulsion systems 18 do not interfere with the flow of sheets through the trim remover 10.

Each air propulsion system 18 may include a manifold 36 that connects to one or more air chambers 24 via an air duct 68. In one embodiment, each air chamber 24 includes its own air propulsion system 18. In other embodiments, a single air propulsion system 18 may provide air input into multiple air chambers 24. In yet other embodiments, a single air chamber 24 may receive propelled air from multiple air propulsion systems 18. Although not shown in the figures, tubing, duct or piping can be used to connect a manifold 36 to an air duct 68 in order to deliver propelled air from an air propulsion system 18 to an air chamber 24. In various embodiments, the tubing, ducts, or piping may be baffled to allow for vertical adjustment of the air chambers 24 without interrupting air flow from the air propulsion systems 18.

In certain embodiments, the air propulsion systems 18 may include one or more frequency drives which can selectively adjust the strength of air flow from the air propulsion systems 18 to the air chambers 24. In such embodiments, air may be propelled through the air chambers 24 sequentially so that air is only directed through air chambers 24 that have sheets underneath. In other embodiments, frequency drives may be used to adjust the amount of air flow through certain air chambers 24 to accommodate sheets of different widths. For example, in a trim remover 10 with three air chambers 24 laterally placed as shown in FIG. 1, frequency drives may be used to direct air only through the central air chamber 24 when sheets of narrower width are being processed by the trim remover 10.

Figure 7:
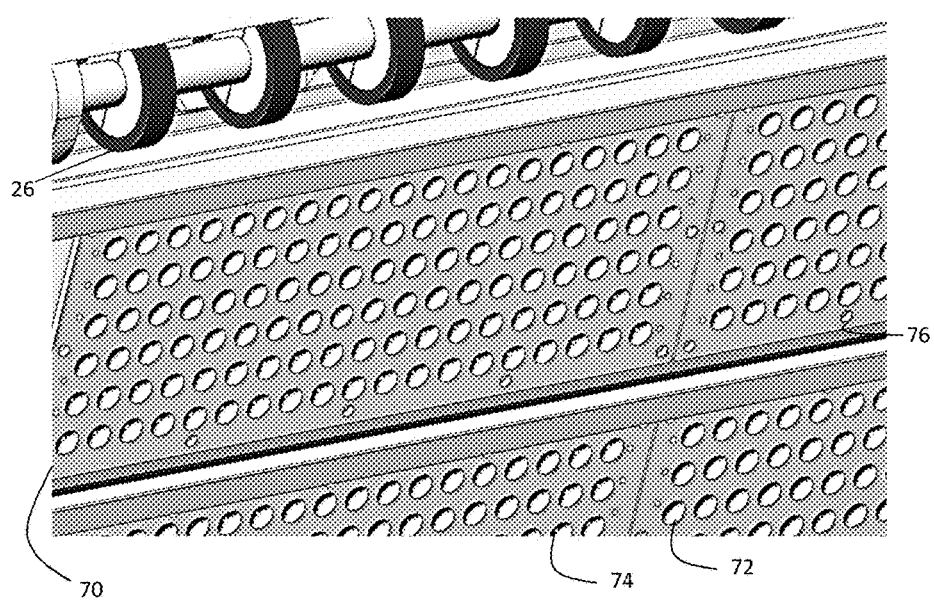
FIG. 7 is a perspective view of an air chamber plate of FIG. 6.

In various embodiments, the air chambers 24 can be substantially hollow chambers having an air chamber plate 70 connected at the lower end of the chamber 24. FIG. 7 is a perspective view of an air chamber plate 70 embodiment that includes a plurality of holes 74 formed therethrough that allow for the passage of forced air. An air chamber plate 70 may further include a plurality of recesses 72 formed thereon. In certain embodiments, air can be forced through the holes 74 by the air propulsion systems 18 (FIG. 1). The recesses 72 may direct a flow of air towards the sheets so as to apply a downward force on the top side of the sheets. The downward force may keep the sheets in contact with the lower wheels 38 as well as keep loose trim moving downward, away from the sheets.

In some embodiments, the recesses 72 may be of generally or substantially conical shape such, that the recesses 72 have a wide opening at or near the flat surface of the air chamber plate 70 and a narrow opening at the top of the recess 72. Each conical or substantially conical recess 72 may terminate in a hole 74 that provides a passageway through which air can flow. In other embodiments, the recesses 72 may have any suitable shape for directing forced air passing through holes 74 at a sheet in order to remove trim from the sheet. The air chamber plates 70 may be fastened to the air chambers 24 by any suitable fastening mechanism (e.g., nails, bolts, screws, welds, etc.). Holes 74 may be flush with the chamber plate, recessed, surrounded by brushes, etc.

Figure 8:
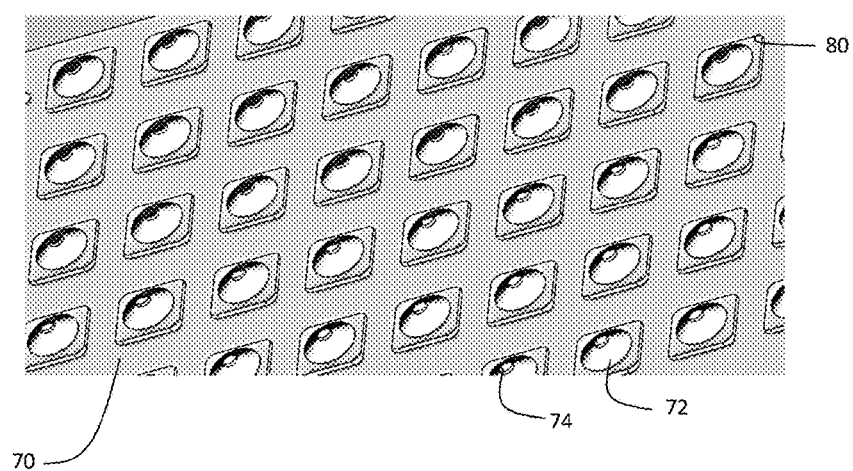
FIG. 8 is a perspective view of an additional embodiment of the air chamber plate of FIG. 6.
Figure 28:
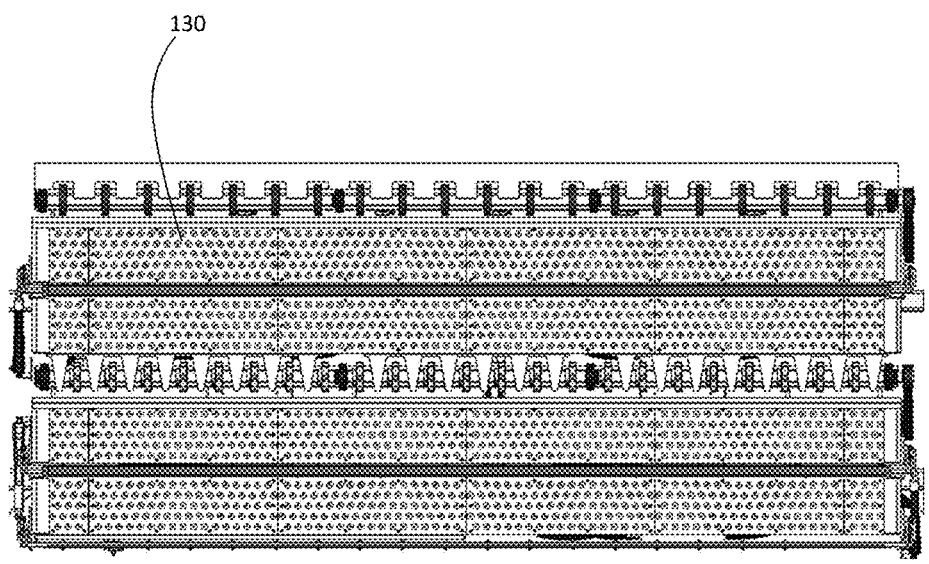
FIG. 28 is a top plan view of an air chamber plate of the trim remover of FIG. 20.

FIG. 8 depicts an air chamber plate 70 in accordance with an embodiment. As shown in FIG. 8, an air chamber plate 70 may include secondary recesses 80 that surround the substantially conical recesses 72. The secondary recesses 80 may provide a greater volume and area for low pressure air to build and develop a film of air across the top of the sheet. By increasing the volume of the substantially conical recesses 72 with the addition of the secondary recesses 80, the pressure of air in the recesses 72 and 80 decreases and the speed of the air increases. In various embodiments, faster moving air provides a more consistent film of air over the sheet which may provide a more uniform downward force on the sheet and a greater ability to press the sheet against lower wheels 38. FIG. 28 shows another embodiment of the air chamber plate 130 used in connection with the embodiment of the trim remover 110 shown in FIGS. 20-21.

Figure 9:
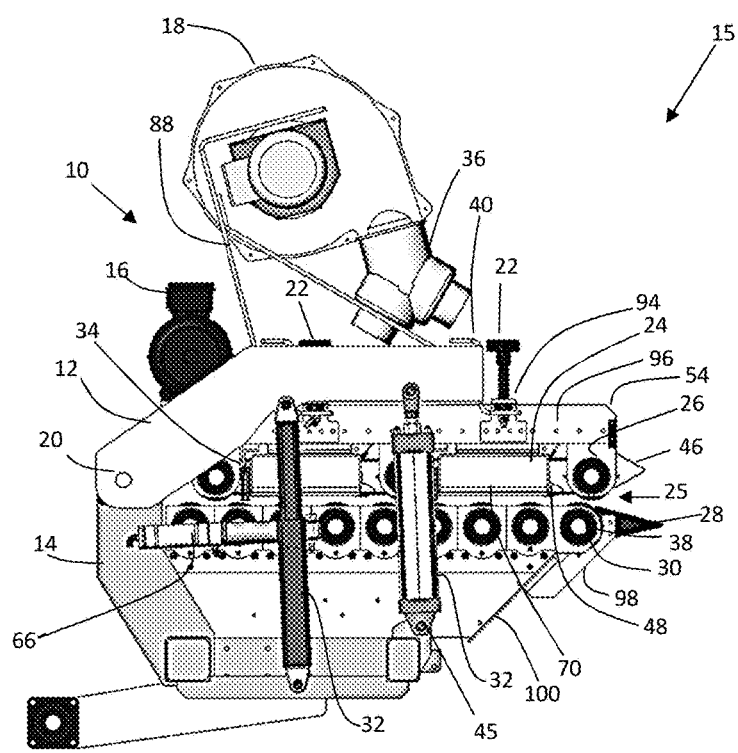
FIG. 9 is a side elevation view of the trim removal section of FIG. 1 in operating mode.
Figure 10:
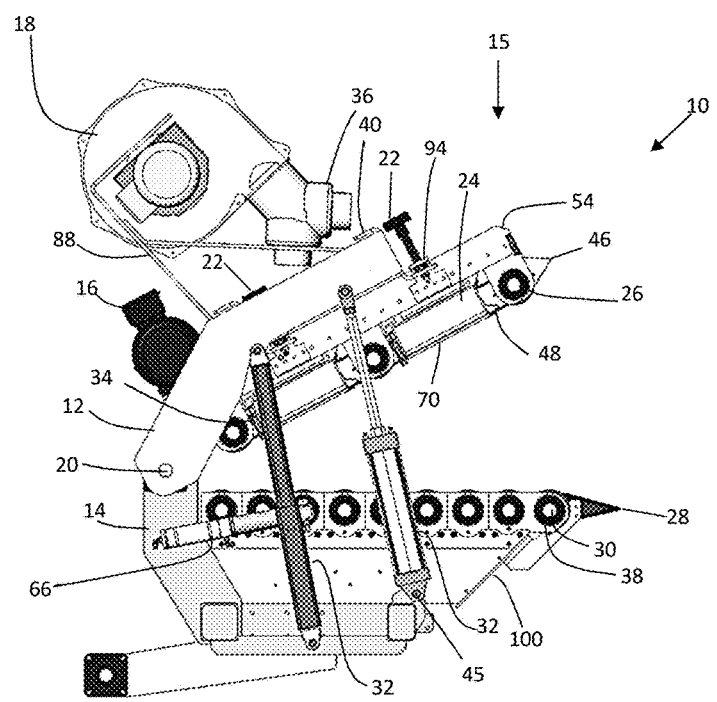
FIG. 10 is a side elevation view of the trim removal section of FIG. 1 in an open access position.

In accordance with various embodiments, the trim remover 10 may be manually or automatically opened to provide access to the interior of the trim remover 10. FIGS. 9 and 10 are side elevations views of the trim remover 10 shown in FIG. 1. As shown in FIGS. 9 and 10, the trim remover 10 may have a generally clam shell type construction that allows the top support 12 to be rotatably moved with respect to the bottom support 14. The trim remover 10 may include a hinge 20 that pivotally connects the top support 12 and the bottom support 14. The hinge may be provided at the exit end of the trim remover. The hinge 20 may be, for example, a pin hinge that passes through two complementary apertures in the top support 12 and the bottom support 14. The hinge 20 allows the top support 12 to rotate upwards about the hinge 20, away from the bottom support 14. By providing the trim remover 10 with a clam shell design, the trim remover 10 may be opened to allow for easier access in performing maintenance, adjustments, and/or clearing jams.

In order to facilitate the opening and closing of trim remover 10, the trim remover 10 may include lift mechanisms 32 and 66. In various embodiments, the lift mechanisms 32 and 66 may be hydraulic or pneumatic devices designed to support all or a portion of the weight of the top portion of the trim remover 10. The lift mechanisms 32 and 66 may be attached to the top support 12 and the bottom support 14 by hinge mechanisms 45. The hinge mechanisms 45 allow the lift mechanisms 32 and 66 to rotate relative to the top support 12 and the bottom support 14 when the trim remover 10 is opened or closed. The lift mechanisms 32,66 may also be screw actuators or a combination of screw and hydraulic or pneumatic devices to provide incremental adjustment of the top portion 12 relative to the bottom portion 14. For instance, as shown best in FIGS. 22 and 23, a screw actuated lift mechanism 180 may be provided at the entry end of the trim remover 110, and a pneumatic or hydraulic actuator 32,66 may be provided at the exit end of the trim remover. The screw actuated lift mechanism may be driven by a motor 182.

FIGS. 9 and 10, in combination, generally demonstrate the opening and closing of the clam shell structure of a trim remover 10 with the aid lift mechanisms 32 and 66. FIG. 9 is a side elevation view of the trim remover 10 with the top support 12 rotated towards the bottom support 14. This position of the top support 12 may correspond to an operating mode of the trim remover 10. More specifically, the trim remover 10 may be operated such that cut sheets are received and conveyed into and through the trim remover 10. FIG. 10 is a side elevation view of trim remover 10 with the bottom support 12 rotated away from the bottom support 14. This position of the top support 12 may correspond to an open access mode of the trim remover 10. Here, the top support 12 is rotated upwards about the hinge 20, away from the bottom support 14. The lift mechanisms 66 and 32 ('180' in FIGS. 22-23) may selectively extend and support the weight of the top portion of trim remover 10. In this way, the open access mode allows for access to the lower wheels 38 and the air chambers 24 for maintenance, cleaning, or clearing jams.

The trim remover 10 may include one or more sensors configured to detect jams. In such embodiments, the trim remover 10 may be configured to automatically cease processing of sheets and enter into the open access mode or position depicted in FIG. 10. Sensors that may be used to detect jams include, but are not limited to, pressure sensors and photo eyes. In one embodiment, the trim remover 10 may include one or more photo eyes 132 (FIGS. 23, 25, 26, 27) that are arranged to detect gaps between sheets. If the gaps are not detected within a configurable amount of time, a photo eye may trigger the trim remover 10 to cease operations, as well as other processing stages, and automatically open the trim remover 10. The trim remover may also have a photoelectric eye 133 (FIG. 27) for counting sheets processed.

In accordance with various embodiments, the position of the head 15 may be adjustable. In one respect, manual adjustments to the connection between the head 15 and the top support 12 may be made so as to adjust the position of the head 15. The head 15 generally includes one or more air chambers 24 that are supported by the air chamber support bar 54. As shown in FIGS. 1, 6 and 9, the air chamber support bar 54 is provided in association with adjustment screws 22 that can be adjusted so as to vertically shift the position of the head 15 with respect to the top support 12.

The adjustment screws 22 may cooperate with a lower bracket 94 that may be fixed to the air chamber support bar 54 using a fastener, such as a nut and bolt assembly. The fastener may connect to the air chamber support bar 54 through one or more of apertures 96 in the air chamber support bar 54. The lower bracket 94 may include a hole formed therethrough that is adapted to receive the adjustment screw 22. The lower bracket 94 may further include threading on the inside of the hole for engaging with threading on the adjustment screw 22.

The adjustment screws 22 may additionally cooperate with an upper bracket 40 that may be attached to the crossbar 92 (FIG. 1). The upper bracket 40 can include a lower portion having a hole formed therethrough and aligned with the hole through the lower bracket 94. The adjustment screw 22 may pass through the hole formed in the lower portion of the upper bracket 40 and secured so that adjustment screw 22 may rotate freely. Accordingly, when the adjustment screw 22 is turned, the lower bracket 94 may be drawn upwards or pushed downwards as a result of the interaction between the threading in the hole of lower bracket 94 and the threading on the adjustment screw 22.

In the exemplary embodiment of FIG. 1, the upper brackets 40 are attached to the crossbar 92. The upper brackets 40 may be used in combination with the vertical adjustment screws 22 and the lower brackets 94 to vertically position the air chambers 24 by vertically moving the air chamber support bars 54. In various embodiments, there may be as many upper brackets 40, vertical adjustment screws 22, and lower brackets 94 as are necessary to support the air chamber support bars 54 and the air chambers 24. For example, in some embodiments, there can be an upper bracket 40 at each edge of each crossbar 92 where each crossbar 92 attaches to the top support 12. In other embodiments, there may be upper brackets 40 located at each point where the air chamber support bars 54 pass the crossbar 92.

In another embodiment, the air chamber support bars 52 may be arranged to be suspended above the lower wheels 38 while being freely moveable in the vertical direction to a certain extent. For example, the air chamber support bars 54 may be suspended by a spring mechanism in addition to or instead of adjustment screws 22. In such an embodiment, the air chambers 24 may propel air downward to create a film of air on the sheets as the sheets pass underneath the air chambers 24. Here, the film of air exerts equal and opposite forces on the sheets and on the air chamber plates 70. Because the air chambers 24 are vertically moveable in this embodiment, any increase or variation in the thickness of the sheets may result in a net force on the air chambers 24. Consequently, the air chambers 24 may vertically adjust in reaction to the net force. For example, if a particularly thick sheet passes beneath an air chamber 24, the film of air becomes compressed, exerting a net upward force on the air chamber plate 70 and the air chamber 24. The air chamber 24 may then automatically adjust itself upward in response to the net force in order to achieve a balanced film of air. In such an embodiment, the automatic vertical adjustment of the air chambers 24 can provide the trim remover 10 with a jam avoidance mechanism by automatically ensuring that there is sufficient space between the air chambers 24 and the sheets below.

In another respect, manual adjustments to the connection between the head 15 and the top support 12 may be made so as to shift the horizontal position of the head 15. As shown in FIG. 2, the air chamber support bars 54 may have a number of apertures 96 formed therethrough for attachment of adjustment brackets 94 and air chambers 24, among other components, such as brushes 34. The apertures 96 allow for horizontal adjustment of the positions of air chambers 24 and air chamber support bars 54 relative to crossbar 92. In various embodiments, there may be more, fewer, or no apertures 96.

The horizontal position of the head 15 may also be adjusted through the operation of a track 42 that is associated with the top support 12. As shown in FIG. 6, the top support 12 may include a track 42 to which the air chamber support bar 54 is connected. The track 42 may allow for horizontal displacement of the upper portion of trim remover 10 independent of and with respect to the bottom support 14 and the lower wheels 38. Through such horizontal displacement, the head 15 including components such as the air chambers 24 and the brushes 34, may be moved to desired positions over the lower wheels 38 and/or other components associated with the bottom support 14. In the depicted embodiment, because the track 42 is positioned at an angle with respect to the horizontal, a horizontal displacement of the air chamber support bar 54 may also result in a vertical displacement of the air chamber support bar 54. Such vertical displacement may be adjusted by further rotating the adjustment screws 22.

Figure 25:
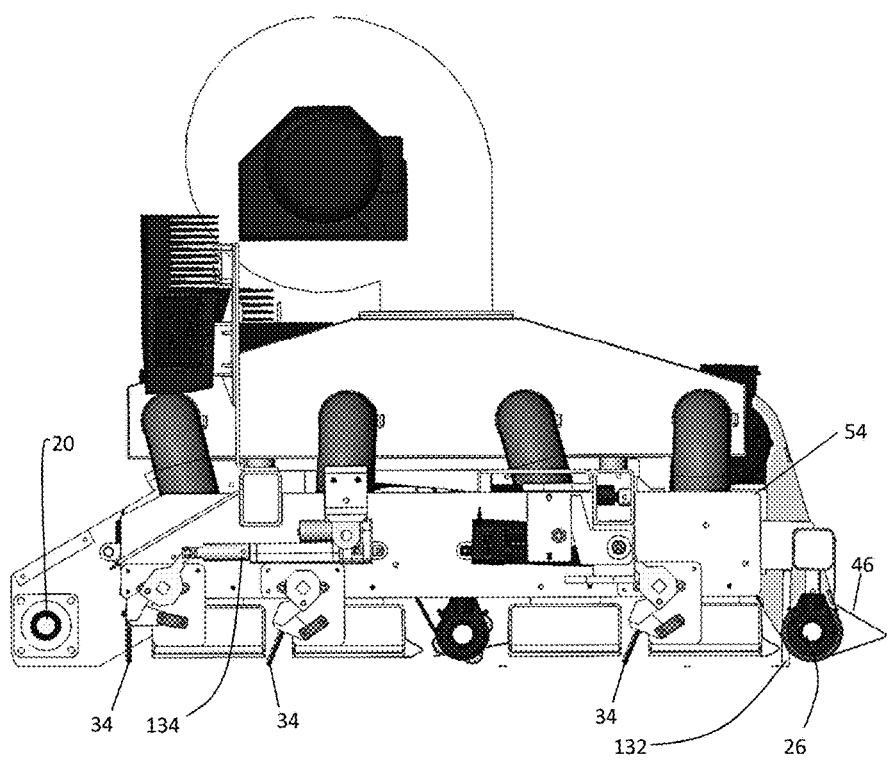
FIG. 25 is a side view of the trim remover of FIG. 20 with certain structure removed for ease of illustration of other components.
Figure 26:
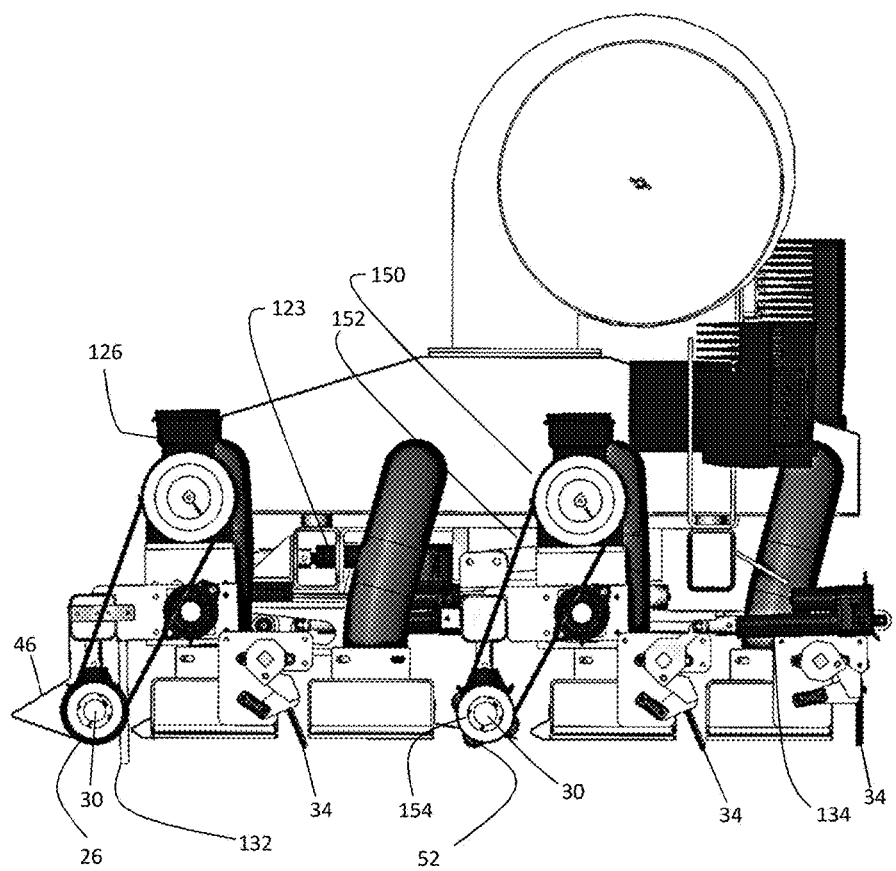
FIG. 26 is a side view opposite the view of FIG. 25 with certain structure removed for ease of illustration of other components.

As shown in FIG. 1, the trim remover 10 further includes one or more brushes 34. In various embodiments, the brushes 34 may be positioned before the air chambers 24, after the air chambers 24, in between the air chambers 24, or any combination thereof. The brushes 34 may be attached to the air chamber support bars 54 by securing the brushes 34 through one or more of the apertures 96 in the air chamber support bars 54. The brushes 34 may be secured to the air chamber support bar 54 using a hanging attachment 44. The hanging attachment 44 may be secured to the air chamber support bar 54 using a pin or nut and bolt fastener through an aperture 96. Other fasteners may be used as well. The brushes 34 may be coupled to the air chamber support bar 54 with actuators that move the brush 34 toward and away from the sheet and adjust the angle between the brush and the sheet. For instance, as shown in FIGS. 25-26, actuators 134 may be arranged on the air chamber support bar 54 to position the brushes 34 located toward the entry end, the intermediate portion, and the exit end of the trim remover.

The brushes 34 may be positioned so as to contact the top of the sheets being conveyed through trim remover 10. The brushes 34 may contact trim that may be on top of the sheets so as to push the trim off of the sheet where it can fall between the gaps defined by the lower wheels 38. From there the trim falls out of the trim remover 10 and may be collected by a scrap conveyer that is located underneath the trim removal section 10. The brushes 34 may have bristles of sufficient rigidity to apply a downward force on any trapped trim in the sheets and act to push and separate the trapped trim from the sheet. The embodiment of FIG. 1 shows multiple brushes 34 placed before and after each air chamber 24. Other configurations of brushes 34 are also possible.

Figure 22:
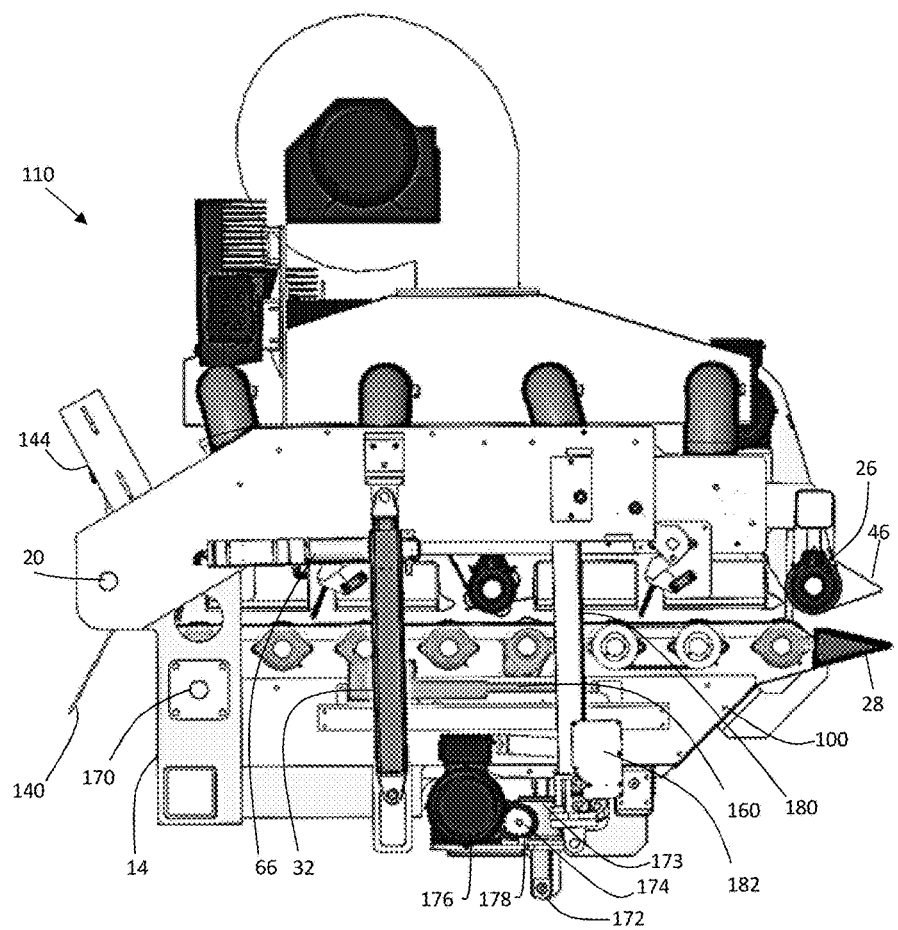
FIG. 22 is a side view of the trim remover of FIG. 20 with an upper structure closed relative to a lower structure.
Figure 23:
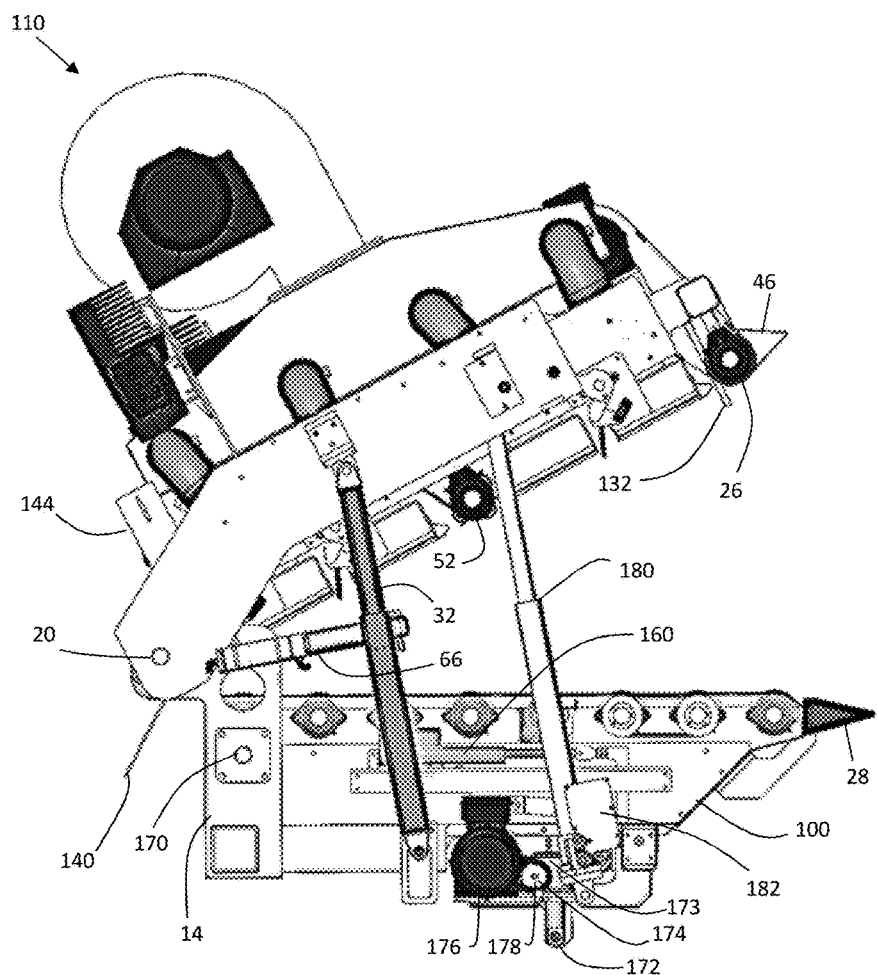
FIG. 23 is a side view of the trim remover of FIG. 22 with the upper structure pivoted open relative to the lower structure.

In yet other embodiments, for instance as shown in FIGS. 21-24, a long flexible brush 140 may be provided on the exit end of the trim remover 110. The long flexible brush 140 may be provided with pivot connection 142 (FIG. 24) to the top support 12 so as to allow the angle between the brush and the exiting sheet to separate trapped trim in the sheets and to apply sufficient force to push and separate the trapped trim from the sheet. The long flexible brush 140 may be positioned with an actuator 144 (FIGS. 21-23).

Figure 32:
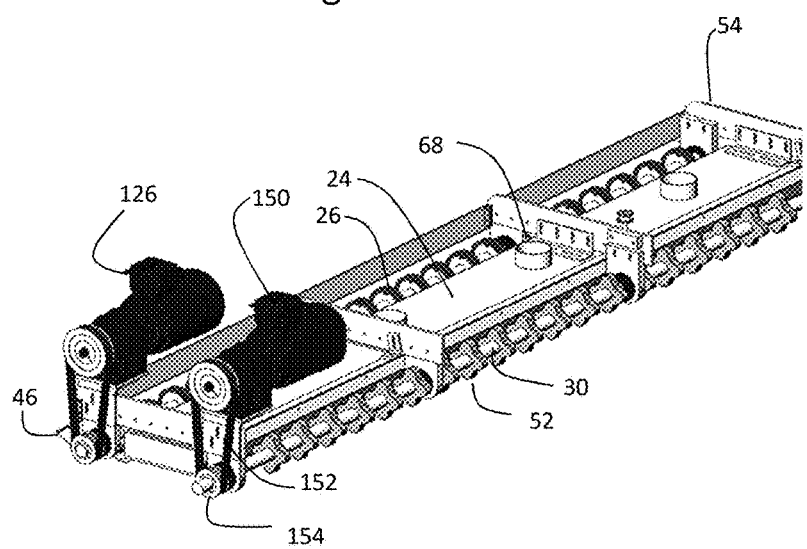
FIG. 32 is a partial perspective view of a portion of an upper head of an alternate embodiment of the trim remover showing additional detail of an upper vibratory lobe axle rotation motor and top wheel axle rotation motor.

FIGS. 11-14 are illustrations of an alternative trim remover 10 embodiment that includes an upper vibratory lobe 52 and a lower vibratory lobe 50. In various embodiments, the upper vibratory lobe 52 and the lower vibratory lobe 50 rotate about an axle 30 and transfer vibratory motion to a sheet or sheets passing through the trim remover 10. The lobes may rotate through contact with the sheet and the linear motion of the sheet that is transferred to the lobes. In the alternative, as shown in FIG. 26, 32-33, the upper vibratory lobe 52 may be rotated by a drive system comprising a motor 150, a belt 152, and a pulley operatively 154 coupled to the axle 30. Providing a separate motor 150 for rotation of the upper vibratory lobe axle 30 allows for independent speed control for rotation of the upper vibratory lobe 52. For instance, in FIG. 32, the upper vibratory lobe axle 30 may be rotated by the motor 150 and the upper wheels 26 may be rotated with the motor 126. The speed of entry of the sheet through the nip point may be set with the motor 126, and the speed of rotation of the upper vibratory lobe 52 may be independent of the upper wheel speed and sheet speed. The lower vibratory lobe may be rotated in a like fashion. For instance, FIG. 33 shows a motor 155, a belt 156, and a pulley 157 operatively coupled to the axle 30 for the lower vibratory lobe 50, and the separate motor 158 for rotating the lower wheels 38. This allows for the lower vibratory lobe axle 30 to be rotated independently of the lower wheels 38. As the upper vibratory lobe 52 and the lower vibratory lobe 50 rotate, the lobes may contact the sheet multiple times, transferring a vibrational motion to the sheet. The vibratory motion may assist in shaking free trim from the sheet or sheet.

Figure 11:
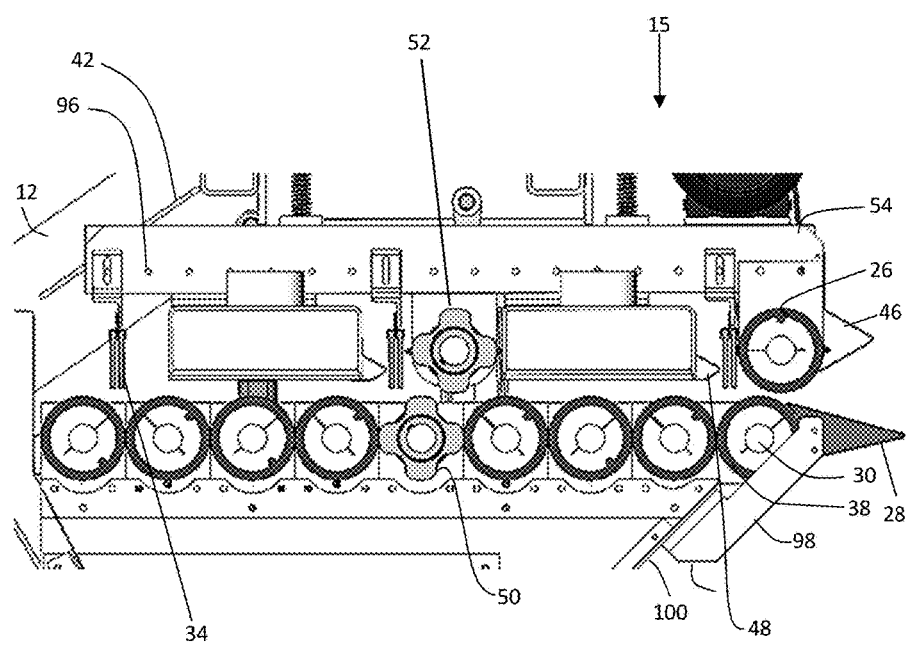
FIG. 11 is a cross-sectional side view of an additional trim removal section embodiment.
Figure 30:
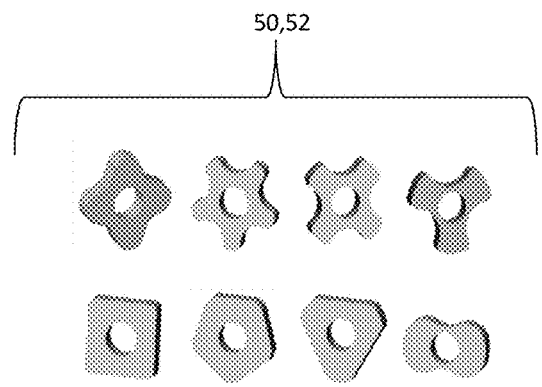
FIG. 30 show alternate designs of vibratory lobes/

The upper vibratory lobe 52 and the lower vibratory lobe 50 may be of various shapes and sizes. The lobes 50,52 may have a width that extends across the width of the trim remover along the axle 30 or a plurality of lobes may be positioned on the axle. FIG. 30 provides other examples of vibratory lobes 50,52. For example, as shown in FIG. 11, the upper vibratory lobe 52 may have four lobes positioned at 90 degree angles to one another about the central axle. In other embodiments, the upper vibratory lobe 52 may have greater or fewer lobes and the lobes may be positioned at regular or irregular intervals. The lower vibratory lobe 50 may contain similar features as the upper vibratory lobe 52, however the lower vibratory lobe 50 may be positioned substantially in line with the lower wheels 38. In various embodiments, the upper vibratory lobe 52 and the lower vibratory lobe 50 are positioned to complement each other such that when a lobe of one is contacting a sheet, the lobes of the other are not contacting the sheet. In such a configuration, the sheet may receive alternating upwards and downwards forces in order to increase the likelihood that the vibratory lobes shake trim from the sheet.

Figure 24:
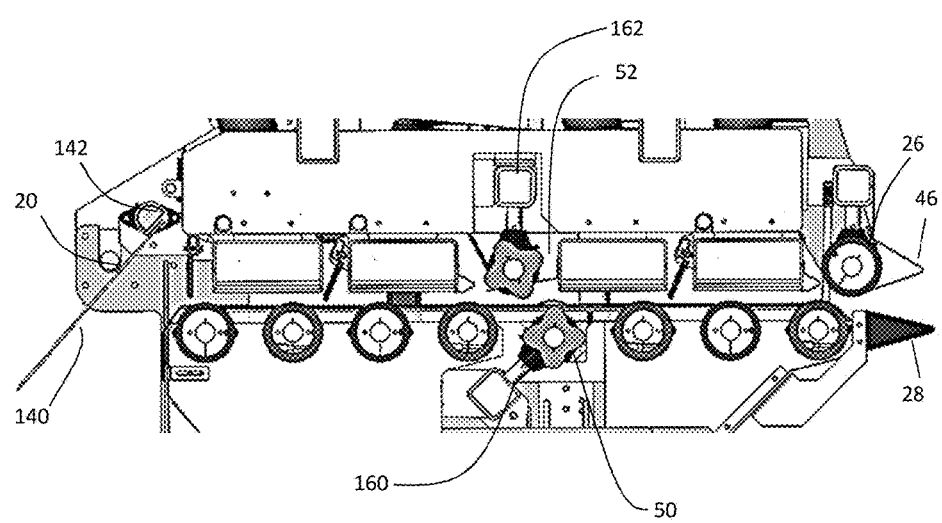
FIG. 24 is a side view of the trim remover of FIG. 20 with certain structure removed for ease of illustration of other components.
Figure 31:
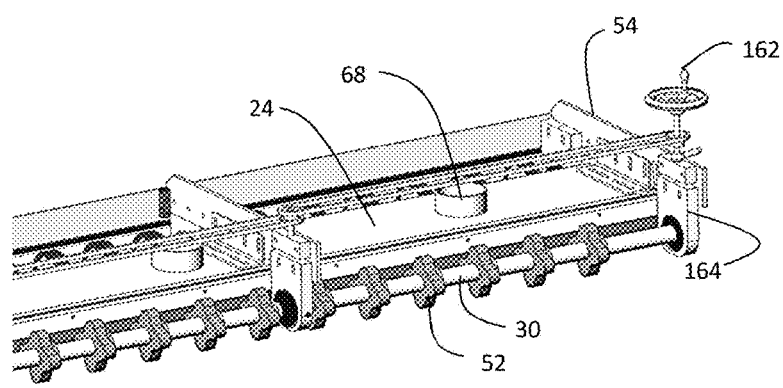
FIG. 31 is a partial perspective view of an upper vibratory lobe axle adjustment mechanism.

In various embodiments, the alternating upwards and downwards forces may be achieved in multiple ways. For example, the upper vibratory lobe 52 may be horizontally offset with respect to lower vibratory lobe 50, as shown in FIG. 11. Alternatively, upper vibratory lobe 52 and lower vibratory lobe 50 may be vertically aligned, but the timing of the lobes may be offset so that only one lobe from either of the vibratory lobes contacts the sheet at one time. The upper vibratory lobe 52 and the lower vibratory lobe 50 can be positioned relative to one another as desired using the track 42 and the adjustment screw 22 as described above in connection with FIG. 6. In the alternative as shown in FIGS. 22-24, an actuator 160 may be provided to allow adjustment of the distance of the lower vibratory lobes 50 to the sheet. An actuator 162 may also be provided for the upper vibratory lobe 52. FIG. 31 provides an alternate example of adjusting the distance between the upper vibratory lobe 52 and the sheet, using a handle wheel drive system 162 which moves a threaded rod in a bearing block support 164 for the upper vibratory lobe axle 30 vertically relative to the air chamber support bar 54. Additional threaded rods may be provided at each bearing block support with sprockets and chains. When the hand wheel and threaded rod attached to the hand wheel turns, the rotation may be transmitted to the additional rods providing vertical adjustment. A motor may also be provided to replace the hand wheel to provide the rotation for the threaded rods and the vertical adjustment.

Figure 15:
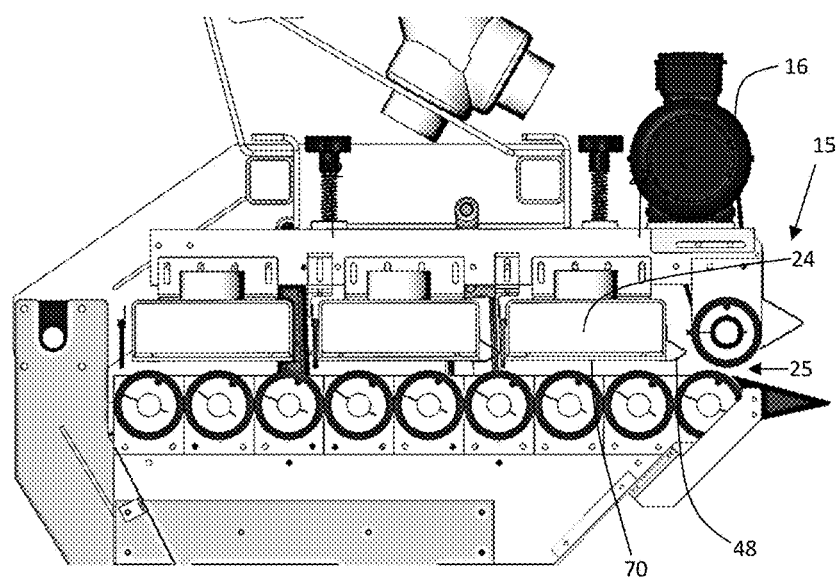
FIG. 15 is a cross-sectional side view of another trim removal section embodiment.

The trim remover 10 embodiment shown in FIG. 1 includes two rows of air chambers 24 by way of example and not limitations. In various embodiments, a trim remover 10 may include any number of rows of air chambers 24 as appropriate given the implementation. For example, FIG. 15 illustrates a trim remover 10 embodiment that includes three rows of air chambers 24.

Figure 16:
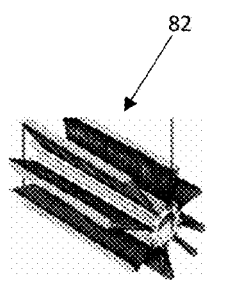
FIG. 16 depicts a rotary brush for use in a trim remover, in accordance with an embodiment.

FIG. 16 depicts a rotary brush that is generally identified by reference numeral 82. The rotary brush 82 is configured for use in a trim remover 10 in accordance with embodiments discussed herein. In various embodiments, a portion of the upper wheels 26 and/or the lower wheels 38 may be rotary brushes 82. Rotary brushes 82 may serve to sweep loose trim from the sheet as the sheet is conveyed through the trim remover 10. Additionally, force from individual brushes on the rotary brush 82 may provide pressure on the sheet to push trapped trim off of or out of the sheet.

Figure 17:
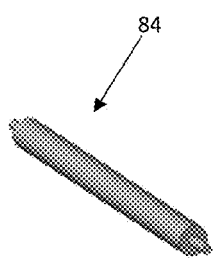
FIG. 17 depicts a wide roller for use in a trim remover, in accordance with an embodiment.

FIG. 17 depicts a wide roller that is generally identified by reference numeral 84. The wide roller 84 is configured for use in a trim remover 10 in accordance with embodiments discussed herein. In various embodiments, a portion of the upper wheels 26 and/or the lower wheels 38 may be wide rollers 84. Wide rollers 84 may provide a larger contact surface with the sheets conveyed through the trim remover 10. A larger contact surface may increase the static friction between the wheels and the sheet which may prevent the sheets from slipping and provide consistent progress of the sheets through the trim remover 10.

Figure 18:
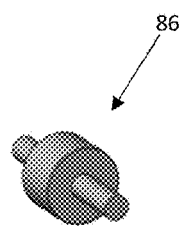
FIG. 18 depicts a narrow roller for use in a trim remover, in accordance with an embodiment.

FIG. 18 depicts a narrow roller that is generally identified by reference numeral 86. The narrow roller 86 is configured for use in a trim remover 10 in accordance with embodiments discussed herein. In various embodiments, a portion of the upper wheels 26 and/or the lower wheels 38 may be narrow rollers 86. Narrow rollers 86 may be used in order to increase separation between the lower wheels 38 to allow for larger pieces of trim to fall away from the sheets as the sheets are conveyed through the trim remover 10.

Additional machine configurations are possible other than those depicted in the figures without departing form the scope of the present disclosure. For example, the section of trim remover 10 described above may be followed by a section of vacuum from below to provide additional trim removal mechanisms as the sheet is conveyed along the lower wheels 38.

Figure 19:
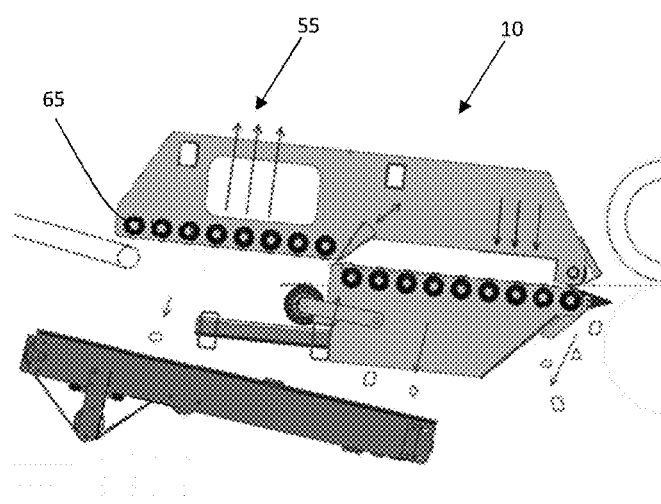
FIG. 19 is side view of a trim remover having an overhead vacuum conveyor, in accordance with an embodiment.

As shown in FIG. 19, a section of overhead vacuum 55 may be used to convey sheets in addition to or alternatively to the embodiments discussed above. By providing an overhead vacuum 55 section for conveyance, the trim remover 10 may allow additional space for trim to fall from the sheet by reducing or eliminating the lower wheels 38 underneath the overhead vacuum portion. The overhead vacuum 55 may be coupled with overhead driven wheels 65 in order to convey the sheet to a subsequent stage of processing or toward a subsequent mode of conveyance, such as a conveyor belt. As shown in FIG. 19, a scrap conveyor 75 may be used to convey loose trim that has fallen from the sheet to a scrap processing system for disposal or recycling. As shown in FIG. 21, the trim remover may be provided with latch mechanisms 170 to allow connection of the trim remover to downstream equipment.

In accordance with various embodiments, the trim remover may be tilted. For instance, the position of the lower structure 100 may be adjustable relative to the bottom support 14. As shown in FIGS. 20 and 22-23, a pivot 170 may be provided to allow the lower structure 100 to be tilted relative to the bottom support 14. The lower structure 100 may be supported against the bottom support with the pivot 170 at the exit end of the trim remover (FIGS. 22-23), and with tilt screws 172 at the entry end of the trim remover (FIG. 20). The tilt screws 172 may include an angled gearbox drive (i.e., right angle gear box). The vertical position of the tilt screw 172 (and thus the amount of tilt) may be set by rotation of a tilt screw drive axle 174 extending across the width of the trim remover 110 operatively coupled to the tilt screw angled gearbox. A motor 176 with geared output 178 may be provided to rotate the tilt screw drive axle 174 and set the amount of tilt.

In view of the foregoing, it will be seen that the several advantages of the invention are achieved and attained. The embodiments were chosen and described in order to best explain the principles of the disclosure and their practical application to thereby enable others skilled in the art to best utilize the principles in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A method for removing trim from sheets, the method comprising:
   conveying a sheet over a plurality of wheels in a direction of travel, the wheels positioned spaced apart in both the direction of travel and in a direction transverse to the direction of travel in a manner to permit trim to pass therethrough; and propelling air, via one or more air chambers toward the sheet to remove trim from the sheet.

2. The method of claim 1, wherein a pressure and a location of the air is configurable.

3. The method of claim 1, wherein the one or more air chambers comprises: one or more air chamber plates having a plurality of holes formed therethrough for propelling air toward the sheet.

4. The method of claim 3, wherein the one or more air chamber plates further comprises:

a plurality of recesses formed on the one or more air chamber plates, wherein at least one hole in the plurality of holes is formed through each of the plurality of recesses.

5. The method of claim 1, further comprising:

configuring a number of air chambers in the one or more air chambers based, at least in part, on a size of the sheet.

6. A method for removing trim from sheets, the method comprising:

conveying a sheet directly over a plurality of wheels, the wheels positioned to permit trim to pass therethrough; and propelling air against the sheet to remove trim from the sheet and maintain the sheet in direct engagement with the wheels.

7. The method of claim 6 further comprising applying a rotating lobed roller against the sheet.

8. The method of claim 6 further comprising applying a brush against the sheet.

* * * * *